March 5, 1963 K. S. HAYS 3,080,184
LOCKING PIN
Filed March 29, 1961
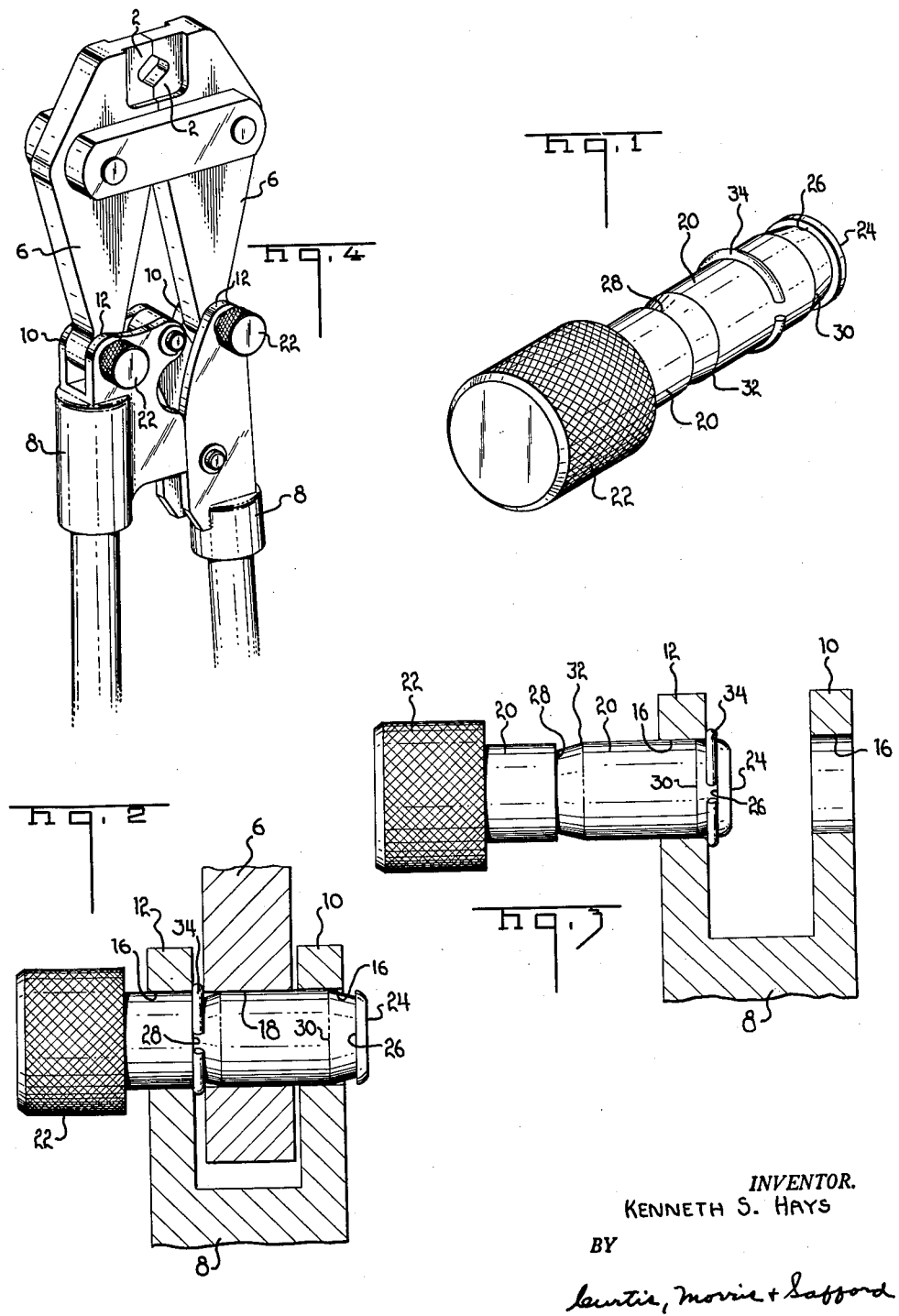
INVENTOR.
KENNETH S. HAYS

3,080,184
LOCKING PIN
Kenneth S. Hays, West Chester, Pa., assignor to AMP Incorporated, Harrisburg, Pa.
Filed Mar. 29, 1961, Ser. No. 99,275
1 Claim. (Cl. 287—100)

This invention relates to locking pins of the type used to secure a first plate-like member between a pair of spaced-apart plates or ears.

An object of the invention is to provide an improved and simplified form of locking pin. A further object is to provide a pin which is effective to lock a plate between a pair of ears or the like but which permits removal of the locked plate without disassembly of the locking pin. A still further object is to provide a locking pin which is positive in its action but which permits removal of the locked member in a minimum of time.

These and other objects are achieved in a preferred embodiment of the invention comprising a cylindrical pin which is adapted to lock a plate or the like between a pair of parallel spaced-apart ears. The ears and the plate provide aligned openings of substantially uniform diameter through which the pin extends. The pin has a circumferential groove adjacent its end and a second circumferential groove which is located between one face of the plate and the internal surface of the adjacent ear. A circular spring is disposed in this second circumferential groove and extends radially beyond the surface of the pin and radially beyond the limits of the aligned openings in the ears and the plate. In this manner, the pin is prevented from accidental axial movement so that the plate is retained in place between the ears. At the same time, it is possible to move the pin axially against the force of the spring so as to release the locked plate. Upon such axial movement of the pin, the spring is located in the circumferential groove which is adjacent to its end. When the spring lodges in this circumferential groove, it is impossible to remove the pin from between the plates so that it cannot become lost or misplaced.

In the drawing:

FIGURE 1 is a perspective view of a locking pin in accordance with the invention.

FIGURE 2 is a cross-sectional view showing a plate locked between a pair of ears by means of a pin in accordance with the invention.

FIGURE 3 is a view similar to FIGURE 2 but showing the pin in its withdrawn or retracted position to permit removal of the plate.

FIGURE 4 is a perspective view showing one type of tool with which the invention can be used.

Locking pins in accordance with the invention can be used in virtually any instance where it is necessary to lock a plate-like member between a pair of spaced-apart ears or the like. For example, in FIGURE 4 there is shown a connector crimping tool having a pair of jaws 6 and handles 8 which, upon manipulation thereof, cause the jaws and the dies 2 therein to move relatively towards each other. The jaws 6 are replaceable and a locking pin in accordance with the instant invention can be used to advantage to lock these jaws on the ends of the handles as will now be described.

A preferred embodiment of the invention comprises a cylindrical pin having a uniform diameter portion 20 which extends inwardly from one end 24 a substantial distance which should be at least as great as the distance between the external surfaces of the two plates or ears 10, 12. Advantageously, an enlarged head 22 is provided on the opposite end of the pin to facilitate manipulation thereof as will be explained below. A first circumferential groove 26 is provided on the pin adjacent to the end 24 and a second circumferential groove 28 is provided on the uniform diameter portion 20 at a point located a distance from the end 24 which is substantially equal to the distance separating the external face of one of the ears 10, 12 from the internal face of the other one of the ears (see FIGURE 2). Advantageously, the adjacent sides of these grooves 30, 32 taper in opposite directions and toward the axis of the pin while the remote sides of the grooves are relatively sheer or abrupt. For purposes of clear identification, the sides 30, 32 of the grooves are defined as "the proximate sides of the grooves which are nearest to each other" and the remote sides as being "relatively furthest from each other." A circular spring 34 is mounted on the uniform diameter portion of the pin and is adapted to be seated in either of the grooves or to be moved relatively from the one groove to the other groove upon expansion of the spring. The spring can take any desired form but it should have a thickness or diameter such that when it is seated in either of the grooves it extends beyond the surface of the pin.

In use, the pin is normally assembled to the handles as shown in FIGURE 3 and is held in place by the circular spring 34 seated in the groove 26. Since the spring extends beyond the limits of the opening 16 in the ear 12, the pin cannot be removed from the ear. To secure the jaw in place, it is merely positioned between the ears with its opening 18 in alignment with the openings 16 in the ears. Thereafter the pin is moved rightwardly until its end extends beyond the surface of ear 10 and until the grove 28 is located at the interface between the ear 12 and the surface of the jaw 6. When the groove 28 moves into this position, the ring or spring snaps into the groove and prevents accidental axial movement of the pin.

Since it is necessary to expand the circular spring 34 in order to move the pin axially from the position of FIGURE 2 to the position of FIGURE 3, the possibility of accidental axial movement of the pin is extremely remote. On the other hand, such axial movement of the pin can be achieved relatively easily by merely pulling on the pin when it is desired to replace jaw members. A distinct advantage of the invention, aside from its simplicity and ease with which the dies can be changed, is that when changing the jaws it is unnecessary to completely disassemble any of the parts of the pin. It follows that none of the parts can become lost or misplaced when the dies are changed and the operation can be carried out with facility and speed.

Alternative embodiments of the invention will be obvious to those skilled in the art. For example, the spring 34 may constitute a simple lock washer or the like and the pin 20 need not necessarily be a right circular cylinder although this shape is advantageous because of its simplicity. However, a non-circular pin could be used with practicality.

Changes in construction will occur to those skilled in the art and various apparently different modifications and embodiments may be made without departing from the scope of the invention. The matter set forth in the foregoing description and accompanying drawings is offered by way of illustraton only. The actual scope of the invention is intended to be defined in the following claim when viewed in its proper perspective against the prior art.

I claim:

Locking means comprising a pair of spaced-apart ears, a member locked between said ears, said ears and said member having aligned openings of substantially uniform diameter, a pin extending through said openings, a first circumferential groove in said pin at one end thereof, a second circumferential groove in said pin and located at the interface of said member and the one of said ears which is remote from the one end of said pin, the proximate sides of said grooves which are relatively nearest to each other being tapered towards the axis of said pin and the remote sides of said grooves which are relatively furthest from each other being relatively sheer, and an expansible spring disposed in said second circumferential groove, said spring having portions extending radially beyond the surface of said pin and beyond said aligned openings whereby, said member is locked between said ears, said pin being axially movable with respect to said ears with concomitant expansion of said spring thereby to withdraw said pin from said member and to move said first circumferential groove to said interface whereby said member can be removed from between said ears.

References Cited in the file of this patent

UNITED STATES PATENTS

| | | |
|---|---|---|
| 1,771,949 | Blanchard | July 29, 1930 |
| 2,382,291 | Carlberg | Aug. 14, 1945 |
| 2,767,950 | Bellon et al. | Oct. 23, 1956 |

FOREIGN PATENTS

| | | |
|---|---|---|
| 976,239 | France | Oct. 25, 1950 |